(12) United States Patent
Jalloul et al.

(10) Patent No.: US 7,352,829 B2
(45) Date of Patent: Apr. 1, 2008

(54) DATA-AIDED CHANNEL ESTIMATION

(75) Inventors: Louay Jalloul, San Jose, CA (US); Raj Misra, Fremont, CA (US)

(73) Assignee: Infineon Technologies AG (DE)

( * ) Notice: Subject to any disclaimer, the term of this patent is extended or adjusted under 35 U.S.C. 154(b) by 809 days.

(21) Appl. No.: 10/755,971

(22) Filed: Jan. 12, 2004

(65) Prior Publication Data

US 2005/0152478 A1 Jul. 14, 2005

(51) Int. Cl.
*H03D 1/00* (2006.01)

(52) U.S. Cl. ...................... 375/340; 375/147

(58) Field of Classification Search ............... 375/340, 375/316, 377, 224, 227; 330/52, 15, 16; 379/338, 343; 455/130, 237.1, 234.1, 232.1, 455/230
See application file for complete search history.

(56) References Cited

U.S. PATENT DOCUMENTS

| | | |
|---|---|---|
| 6,452,917 B1 | 9/2002 | Leung |
| 6,459,728 B1 | 10/2002 | Bar-David et al. |
| 6,480,554 B1 | 11/2002 | Toskala et al. |
| 6,483,821 B1 | 11/2002 | Dabak et al. |
| 6,539,067 B1 | 3/2003 | Luschi et al. |
| 6,711,384 B2 * | 3/2004 | Kubo et al. .................. 455/68 |
| 2002/0167923 A1 | 11/2002 | Sendonaris et al. |

FOREIGN PATENT DOCUMENTS

| | | |
|---|---|---|
| EP | 1 047 233 A2 | 10/2000 |
| EP | 1 263 179 A1 | 12/2002 |
| EP | 1 480 350 A1 | 11/2004 |
| GB | 2 386 038 A | 9/2003 |
| WO | WO-03/009493 A1 | 1/2003 |

OTHER PUBLICATIONS

Andoh et al., IEICE Trans. Commun., "Channel Estimation Filter Using Time-Multiplexed Pilot Channel for Coherent RAKE Combining in DS-CDMA Mobile Radio," Jul. 1998, vol. E81-B, No. 7, pp. 1517-1526.

(Continued)

*Primary Examiner*—Temesghen Ghebretinsae
(74) *Attorney, Agent, or Firm*—Dickstein, Shapiro, LLP.

(57) ABSTRACT

Forming a channel estimate for a communications channel in a communication system, which a receiver that receives over the communications channel signals including pilot symbols, control symbols, and a set of data symbols. A pilot-only based channel estimate is calculated using the pilot symbols in a first pass through a portion of the control channel. Then pseudo pilot symbols are generated on a basis of a control channel, and then are used to refine the pilot-only based channel estimate. A set of data symbols is then weighted using the refined channel estimate, and the weighted set of symbols is output to a decoder stage.

20 Claims, 8 Drawing Sheets

OTHER PUBLICATIONS

Abeta et al., IEICE Trans. Commun., "Performance Comparison Between Time-Multiplexed Pilot Channel and Parallel Pilot Channel For Coherent Rake Combining in DS-CDMA Mobile Radio," Jul. 1998, vol. E81-B, No. 7, pp. 1417-1425.

Valenti et al., IEEE Journal on Selected Areas in Communications, "Iterative Channel Estimation and Decoding of Pilot Symbol Assisted Turbo Codes Over Flat-Fading Channels," Sep. 2001, vol. 19, No. 19, pp. 1697-1705.

Seshadri, IEEE Transactions on Communications, "Joint Data and Channel Estimation Using Blind Trellis Search Techniques," Feb./Mar./Apr. 1994, vol. 42, No. 2/3/4, pp. 1000-1011.

3GPP TS 25.213 V5.3.0 (Mar. 2003) 3$^{rd}$ Generation Partnership Project; Technical Specification Group Radio Access Network; Spreading and Modulation (FDD) (Release 5).

Jie Zhu and Wookwon Lee; "Channel estimation with power-controlled pilot symbols and decision-directed reference symbols"; IEEE Vehicular Technology Conference, Oct. 6, 2003, pp. 1268-1272, XP010700808.

Xi-Bin Han and Wei-Ping Zhu; "Wideband-CDMA Channel Estimation: A Data-Aided Multi-Slot Averaging Method"; Midwest Symposium Circuits and Systems, Jul. 25, 2004, pp. 1173-1176, XP010738672.

* cited by examiner

DATA-AIDED CHANNEL ESTIMATION

FIELD OF THE INVENTION

The present invention relates to third generation CDMA mobile systems, and more particularly to data-aided channel estimation of third-generation CDMA signals.

BACKGROUND OF THE INVENTION

Third generation code division multiple access (CDMA) mobile systems, such as Universal Mobile Telecommunication System 3GPP (3rd Generation Partnership Program) Wideband CDMA include on the uplink channel pilot symbols which are used by the receiver for channel estimation and other demodulation functions.

Figure 7:
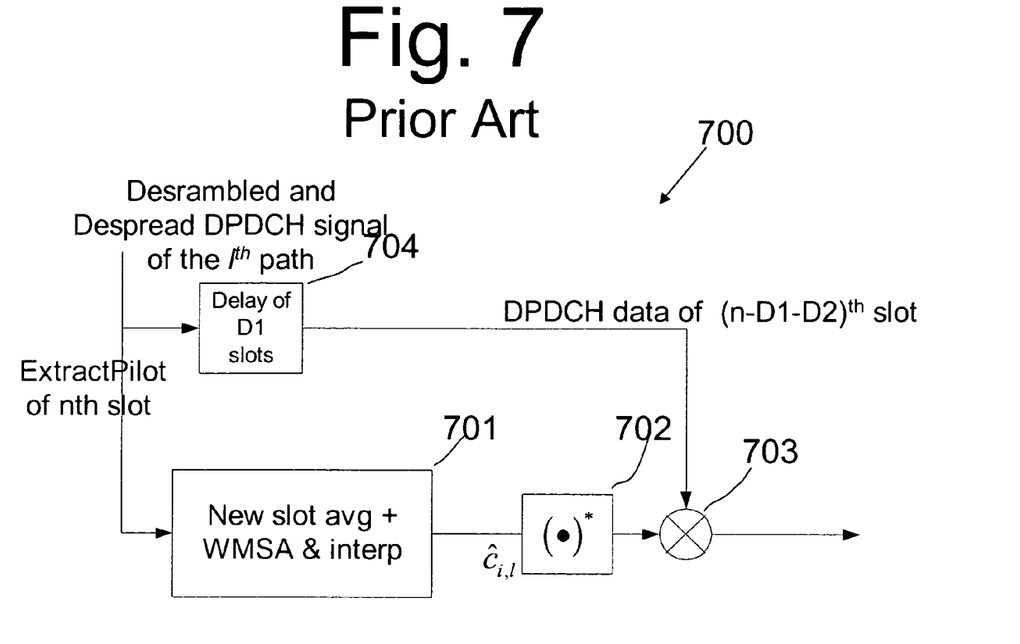
FIG. 7 illustrates a block diagram of a conventional channel estimation receiver that uses pilot symbols only.

FIG. 7 illustrates a block diagram of a conventional channel estimation receiver 700 that uses only pilot symbols to produce a channel estimate. For the $l^{th}$ finger, pilot symbols of the nth slot are extracted from the received descrambled and despread data channel (DPCCH) signal, and the functional section 701 computes a new slot average. This new slot average is filtered in the functional section 701 by a weighted mean square error (WMSA) non-causal channel estimation filter to produce a pilot-only based channel estimate $\hat{c}_{i,l}$. The estimates from the WMSA filter are further linearly interpolated at the control channel (DPCCH) symbol rate. The channel estimate is then input to complex conjugator 702 which calculates and outputs a complex conjugate of the pilot-only based channel estimate $\hat{c}^*_{i,l}$. Simultaneously, data on the data channel is delayed in delay 704 by $D_1$ slots (to account for the non-causal WMSA filter delay) and channel-corrected, that is, multiplied in multiplier 703 by the complex conjugate of the pilot-only based channel estimate $\hat{c}^*_{i,l}$. While this pilot-only based channel estimation receiver 700 is simple, it has disadvantages in that there is poor channel estimate quality in adverse channels, thereby forcing the transmitter to increase either transmit power or coding gain at the expense of the information data rate.

Figure 8:
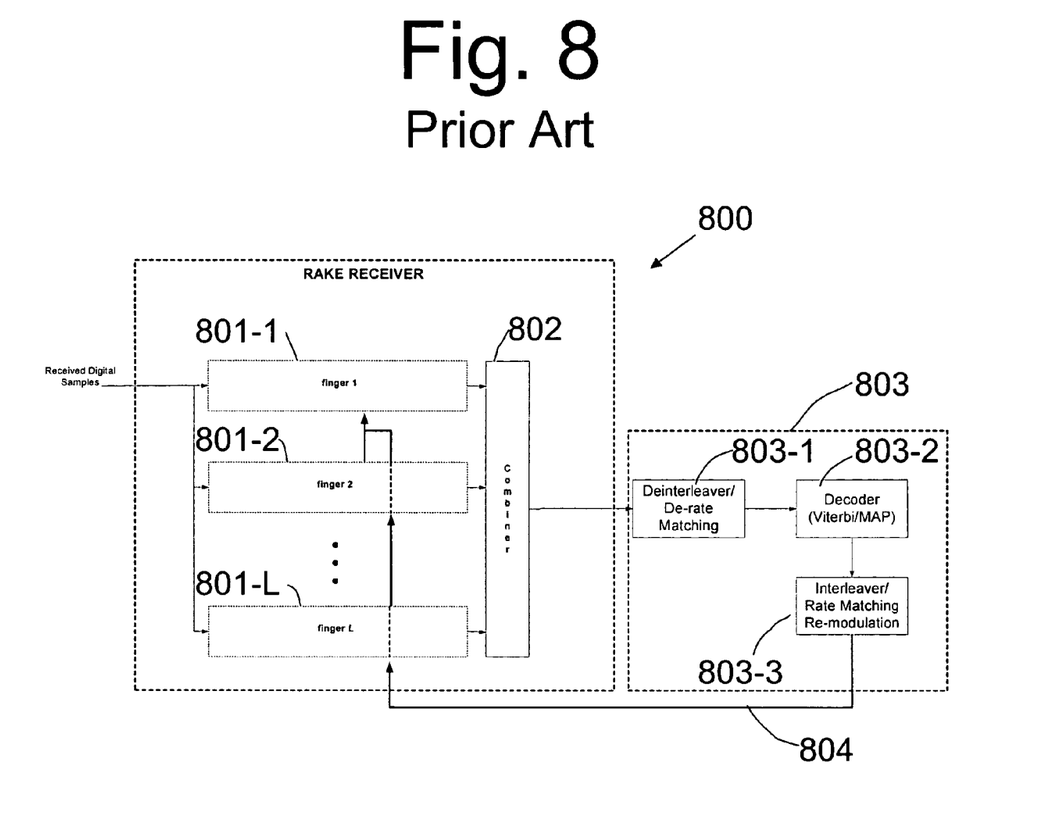
FIG. 8 illustrates a block diagram of another conventional system channel estimation receiver that uses both pilot symbols and post-decoder output.

FIG. 8 illustrates a block diagram of another channel estimation receiver 800 that builds on the receiver 700 of FIG. 7 in that it uses for channel estimation both pilot symbols and post-decoder output. Each of the fingers of the received signal is processed in fingers 1 through L, represented by reference numerals 801-1 through 801-L, respectively, to produce delayed, channel-corrected, data symbols for each finger. The data symbols of the fingers 801-1 to 801-L are then combined by combiner 802 to produce combined data symbol signals. This signal is input to post-receiver processing block 803, in which the signal is processed by deinterleaver/de-rate matcher 803-1, then a decoder 803-2, and then interleaver/rate matcher/re-modultor 803-3. The signal is then fed back to the fingers 1 through L over line 804. While this receiver 800 provides good channel estimates, it is prohibitively more expensive and complex in that it has a significantly increased latency and requires buffering of large chunks of data symbols. Such a receiver is described in M. Valenti and B. Woerner, "Iterative Channel Estimation and Decoding of Pilot Symbol Assisted Turbo Codes Over Flat-Fading Channels," IEEE J. Sel. Areas in Commun., Vol. 19, No. 9, pp. 1697-1705, September 2001.

There is a need for an improved channel estimation receiver that strikes a balance between the simple but poor-quality channel estimation receiver 700 and the complex channel estimation receiver 800.

BRIEF SUMMARY OF THE INVENTION

The present invention provides a method for forming a channel estimate for a communications channel in a communication system, which has a receiver that receives over the communications channel signals including pilot symbols, control symbols, and a set of data symbols. The method comprising the steps of calculating a pilot-only based channel estimate using the pilot symbols in a first pass through a portion of a control channel, generating pseudo pilot symbols on a basis of a control channel, using the pseudo pilot symbols to refine the pilot-only based channel estimate, weighting the set of data symbols using the refined channel estimate, and outputting the weighted set of symbols to a decoder stage.

Further, the present invention provides a method for forming a channel estimate for a communications channel in a communication system, which has a receiver that receives over the communications channel signals including pilot symbols, control symbols, and a set of data symbols. The method comprising the steps of providing a pilot-only based channel estimate for use in the communication system, generating pseudo pilot symbols on a basis of a control channel, using the pseudo pilot symbols to refine the pilot-only based channel estimate, weighting the set of data symbols using the refined channel estimate, and outputting the weighted set of symbols to a decoder stage.

The present invention also provides a system for forming a channel estimate for a communications channel in a communication system having a receiver that receives over the communications channel signals including pilot symbols, control symbols, and a set of data symbols. The communication channel includes a data channel portion and a control channel portion. The system comprises a means for calculating a pilot-only based channel estimate using the pilot symbols in a first pass through the control channel portion, a means for generating pseudo pilot symbols on a basis of information in the control channel portion, a means for using the pseudo pilot symbols to refine the pilot-only based channel estimate, a means for weighting the set of data symbols using the refined channel estimate, and a means for outputting the weighted set of symbols to a decoder stage.

The present invention also provides a system for forming a channel estimate for a communications channel in a communication system having a receiver that receives over the communications channel signals including pilot symbols, control symbols, and a set of data symbols. The communications channel includes a control channel portion and a data channel portion. The system comprises a means for providing a pilot-only based channel estimate, a means for generating pseudo pilot symbols using information in the control channel portion, a means for using the pseudo pilot symbols to refine the pilot-only based channel estimate, means for weighting a set of data symbols using the refined channel estimate, and a means for outputting the weighted set of symbols to a decoder stage.

Moreover, the present invention provides a system for forming a channel estimate for a communications channel in a communication system having a receiver that receives over the communications channel signals including pilot symbols, control symbols, and a set of data symbols. The communications channel includes a control channel portion and a data channel portion. The system comprises a processor, a memory communicatively coupled to the processor, and software executing in the processor. The software is configured to calculate a pilot-only based channel estimate using the pilot symbols in a first pass through the control channel portion, store the pilot-only based channel estimate in the memory, generate pseudo pilot symbols on a basis of information in the control channel portion, store the pseudo pilot symbols in the memory, use the pseudo pilot symbols to refine the pilot-only based channel estimate, store the refined pilot-only based channel estimate in the memory, weight a set of data symbols using the refined channel estimate, store the weighted set of data symbols in the memory, and output the weighted set of symbols to a decoder stage.

Furthermore, the present invention provides a system for forming a channel estimate for a communications channel in a communication system having a receiver that receives over the communications channel signals including pilot symbols, control symbols, and a set of data symbols. The communications channel includes a control channel portion and a data channel portion. The system comprises a processor, a memory communicatively coupled to the processor, and software executing in the processor. The software is configured to provide a pilot-only based channel estimate, store the pilot-only based channel estimate in the memory, generate pseudo pilot symbols on a basis of a control channel, store the pseudo pilot symbols in the memory, use the pseudo pilot symbols to refine the pilot-only based channel estimate, store the refined pilot-only based channel estimate in the memory, weight a set of data symbols using the refined channel estimate, store the weighted set of data symbols in the memory, and output the weighted set of symbols to a decoder stage.

The foregoing and other aspects of the invention can be appreciated from the drawing figures and detailed description.

BRIEF DESCRIPTION OF THE DRAWINGS

The foregoing and other features of the present invention will be more readily apparent from the following detailed description and drawings of illustrative embodiments of the invention, in which.

DETAILED DESCRIPTION OF CERTAIN EMBODIMENTS OF THE INVENTION

By way of overview, the present invention provides a method resulting in an improved channel estimate that enhances system error-rate performance and system capacity, as measured by a reduction in information-bit-energy to noise-spectral-density ratio ($E_b/N_0$) required to meet a specified block error rate (BLER). The method forms the channel estimate by operating on raw demodulator output, thereby not requiring a large amount of memory. The channel estimation method also results in low latency.

Figure 5:
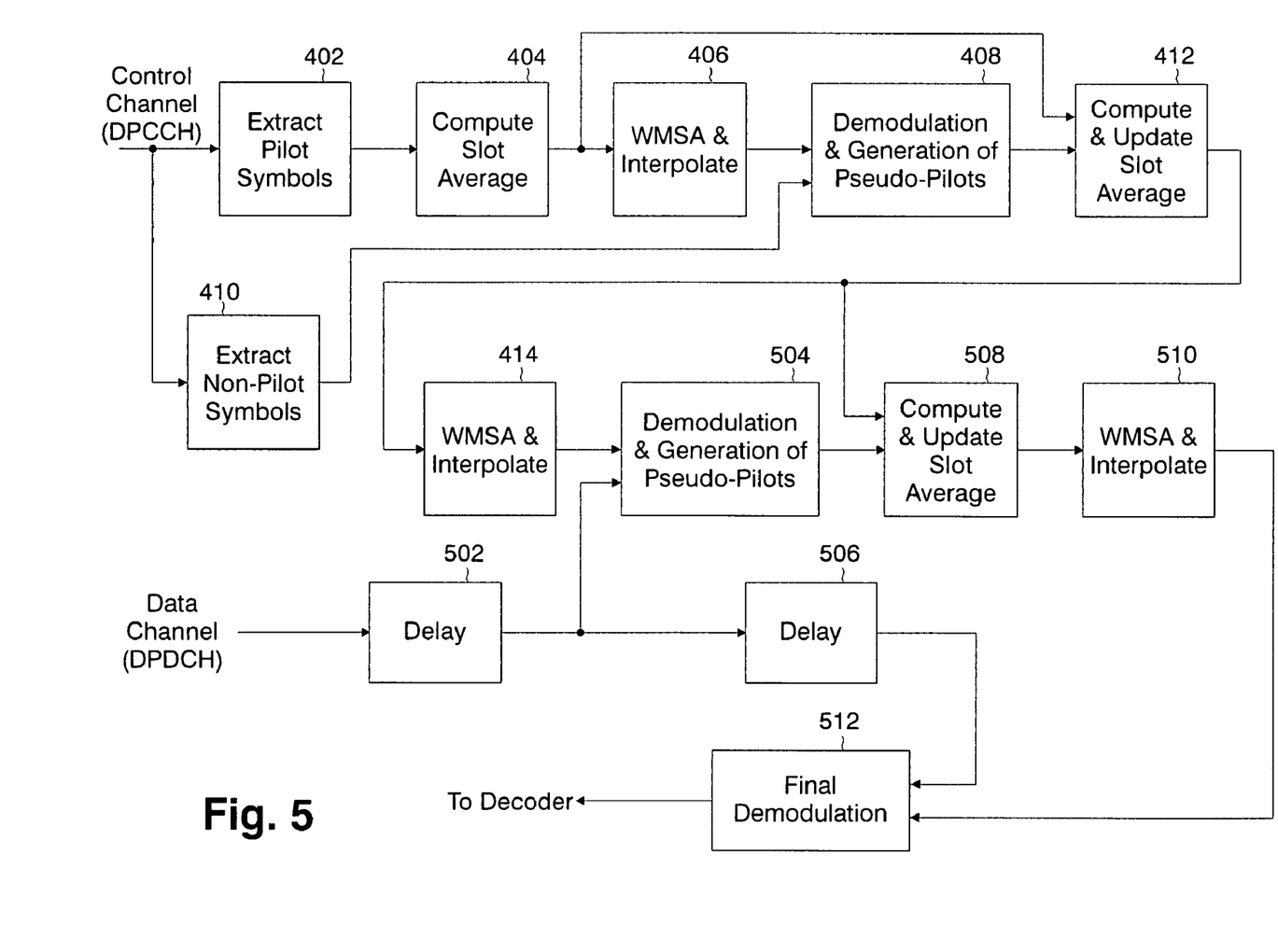
FIG. 5 illustrates a flowchart of the data-aided channel estimation receiver according to a preferred embodiment of the present invention in which pseudo pilot symbols are generated using control and data channels concurrently.
Figure 6:
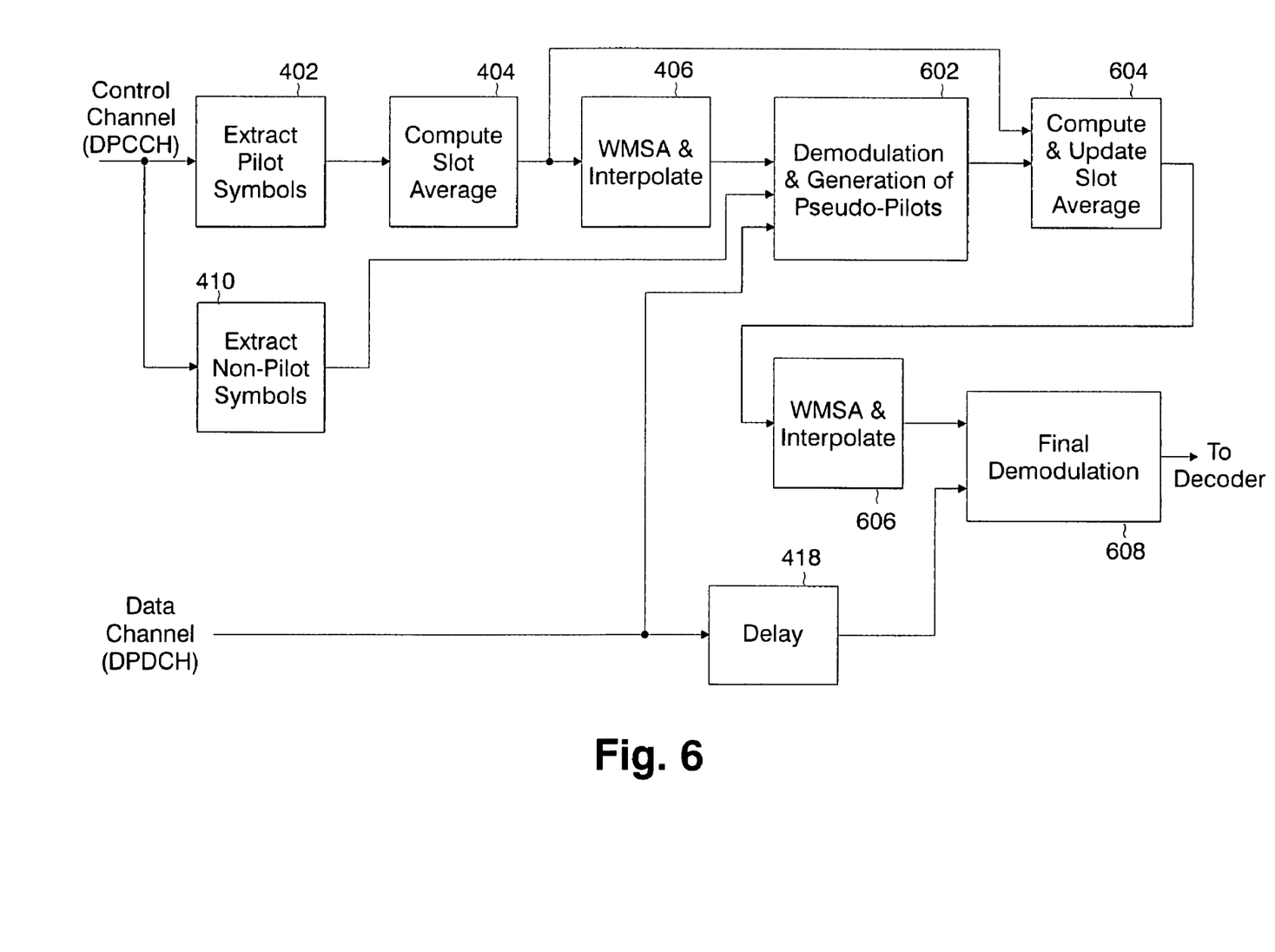
FIG. 6 illustrates a flowchart of the data-aided channel estimation receiver according to a preferred embodiment of the present invention in which pseudo pilot symbols are generated using control and data channels serially.

The present invention is described by first providing an overview of the data-aided channel estimation receiver of the present invention, then an overview of the uplink of wideband CDMA, a list of the notation used throughout the specification, followed by conventional channel estimation, which then provides a basis for channel estimation according to the present invention. The details of three embodiments of the channel estimation according to the present invention are described first by referring to the block diagram of FIG. 3, and then with reference to the flowcharts of FIGS. 4-6, respectively.

A. Data-Aided Channel Estimation Receiver Overview

Figure 1:
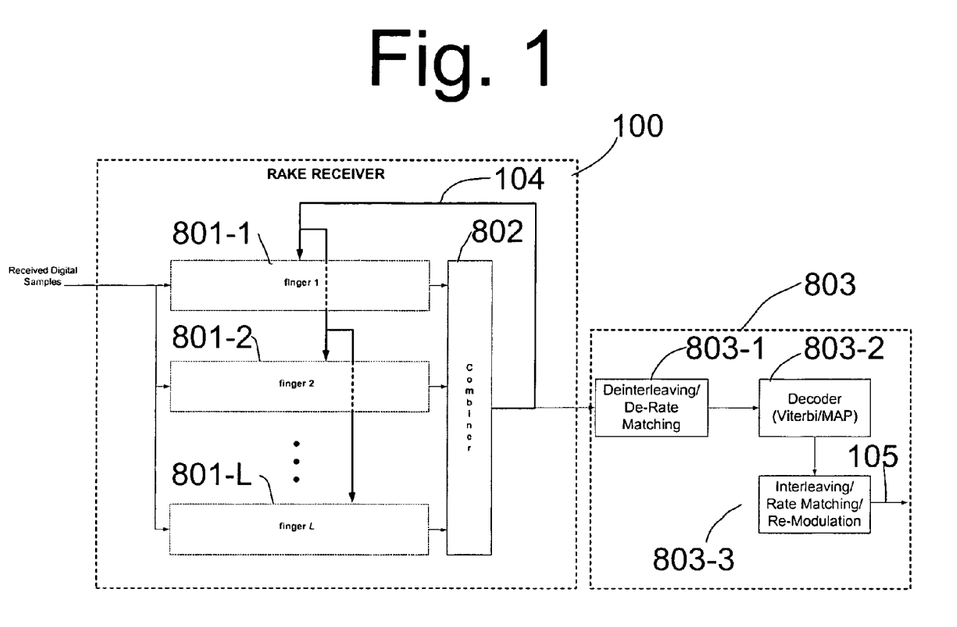
FIG. 1 illustrates an overview of the data-aided channel estimation receiver according to a schematic embodiment of the present invention.

FIG. 1 illustrates an overview of the data-aided channel estimation receiver according to an embodiment of the present invention. In FIG. 1 there is feedback to the fingers 801-1 to 801-L of the rake receiver 100 after the combiner 802 by line 104 to thereby perform additional processing on the signal within the receiver 100 before the signal is passed to the post-receiver processing block 803, processed, and transmitted to the next element (not shown and not forming a part of the present invention) by line 105. The post-receiver processing block 803 of FIG. 1 contains similar elements as that of FIG. 8, and therefore the same reference numerals have been used for these elements.

B. Wideband CDMA Uplink Overview

Figure 2A:
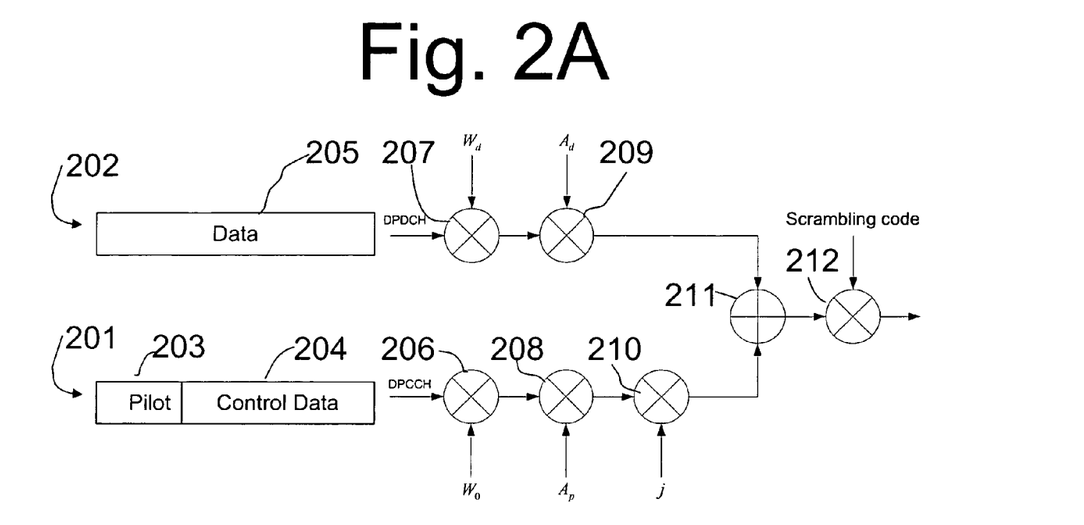
FIGS. 2A and 2B illustrate a frame structure for uplink data and control channels.
Figure 2B:
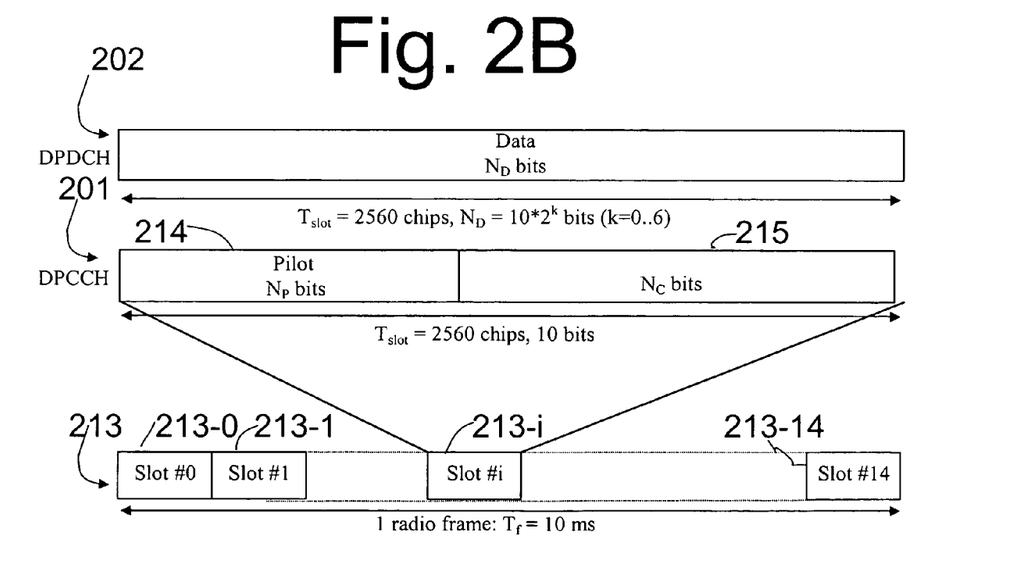

FIGS. 2A and 2B illustrate a frame structure for uplink data and control channels in a wideband CDMA system. FIG. 2A in particular illustrates the principle of uplink spreading in a signal transmitted uplink from a mobile phone to a base station. There are two channels—a dedicated physical control channel (DPCCH) 201 and a dedicated physical data channel (DPDCH) 202. The control channel 201 carries pilot 203 and other control data symbols 204, and the data channel 202 carries encoded data 205.

The control channel 201 symbols are spread to the chip rate by the channelization code $W_0$ in multiplier 206, while the data channel 202 symbols are spread to the chip rate by the channelization code $W_d$ by multiplier 207. After channelization, the real-valued spread control channel 201 symbols are multiplied in multiplier 208 by gain factor $A_p$, and the real-valued spread data channel 202 symbols are multiplied in multiplier 209 by gain factor $A_d$. The weighted control channel symbols from multiplier 208 are then input to multiplier 210 to multiply the spread pilot and control symbols by a complex number j to produce a complex number. The adder 211 then adds the complex number from multiplier 210 of the control channel 201 and the weighted data channel symbols from multiplier 209 of the data channel 202, and outputs the sum to multiplier 212 that multiplies the input by a user specific scrambling code.

FIG. 2B illustrates the frame structure of the control channel 201 and data channel 202. Each frame 213 of both the control channel 201 and data channel 202 has a length of 10 ms, which at a chip rate of 3.84 Mchips/s corresponds to 38,400 chips. The frame 213 is divided into 15 slots (213-0 through 213-14) each of duration of 666.67 microseconds or 2560 chips, wherein one slot is the smallest unit available for issuing power control commands. The uplink data channel 202 is the dedicated data transport channel, and the uplink control channel 201 carries control information for the physical layer. The control channel 201 provides information needed to determine the spreading factor used in the data channel 202 along with other physical layer control information. The control channel slot 213 always has a spreading factor of 256 and consists of 10 information bits split among known pilot bits 214 and other control bits 215.

Figure 3:
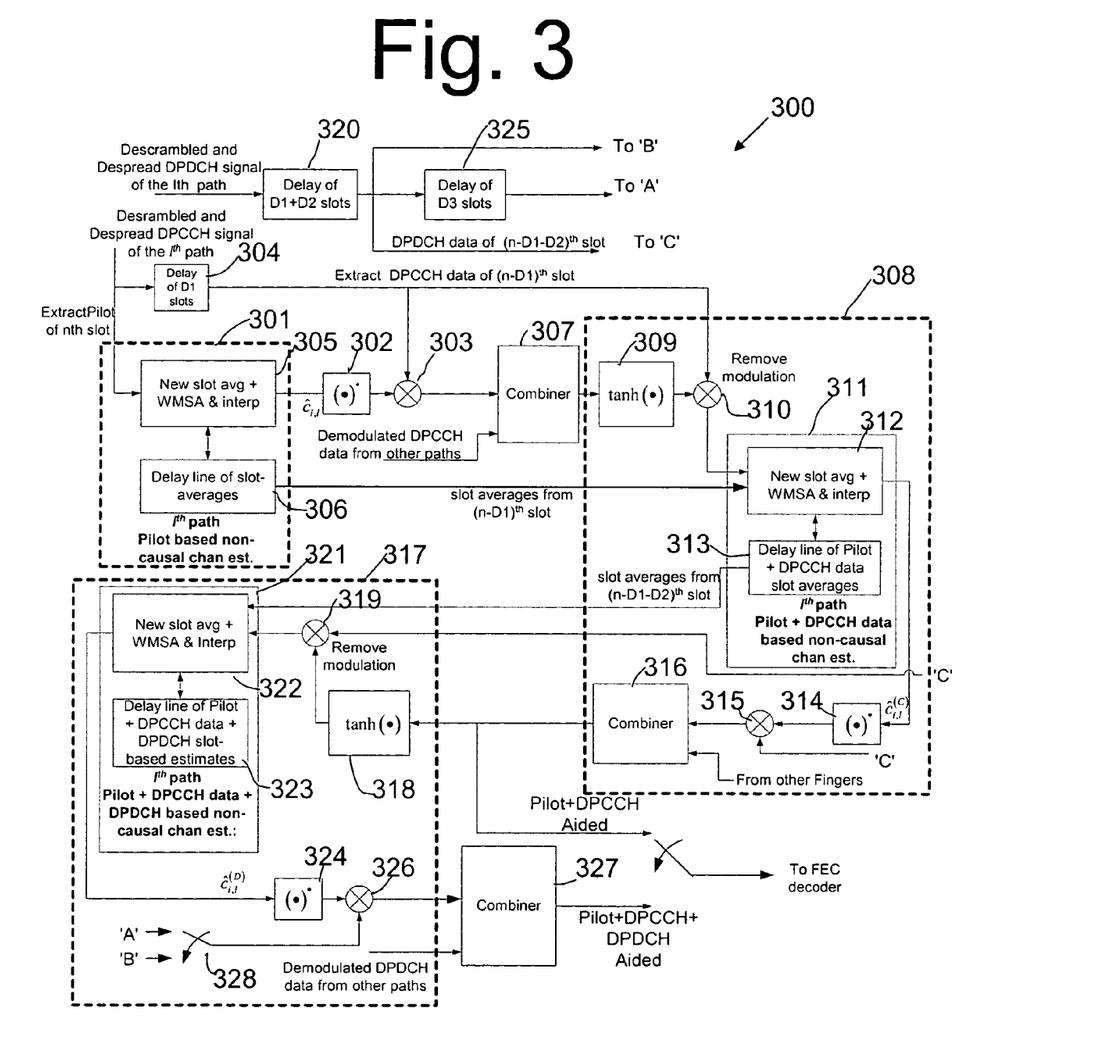
FIG. 3 illustrates the data-aided channel estimation receiver according to a preferred generalized embodiment of the present invention.

C. Channel Estimation According to the Preferred Embodiment of the Present Invention FIG. 3 illustrates a data-aided channel estimation receiver 300 according to the present invention. In this receiver the conventional pilot-only based channel estimate is used to generate pseudo pilots, which in turn are used to obtain an improved channel estimate. The channel estimation receiver 300 of the present invention is described below in terms of three exemplary embodiments—pseudo pilots generated using only a control channel, pseudo pilots generated using control and data channel serially, and pseudo pilots generated using control and data channel concurrently. Since the conventional pilot-only based channel estimate is used as a basis for each of these exemplary embodiments, a detailed description of obtaining the pilot-only channel estimate will be described first.

1. Channel Estimation Using Control Channel only

A pilot-only based channel estimate, which is obtained as illustrated in FIG. 7 and described in the background of the invention section above, is used as a basis for obtaining pseudo pilots in each of the exemplary embodiments described in the next sections.

Figure 4:
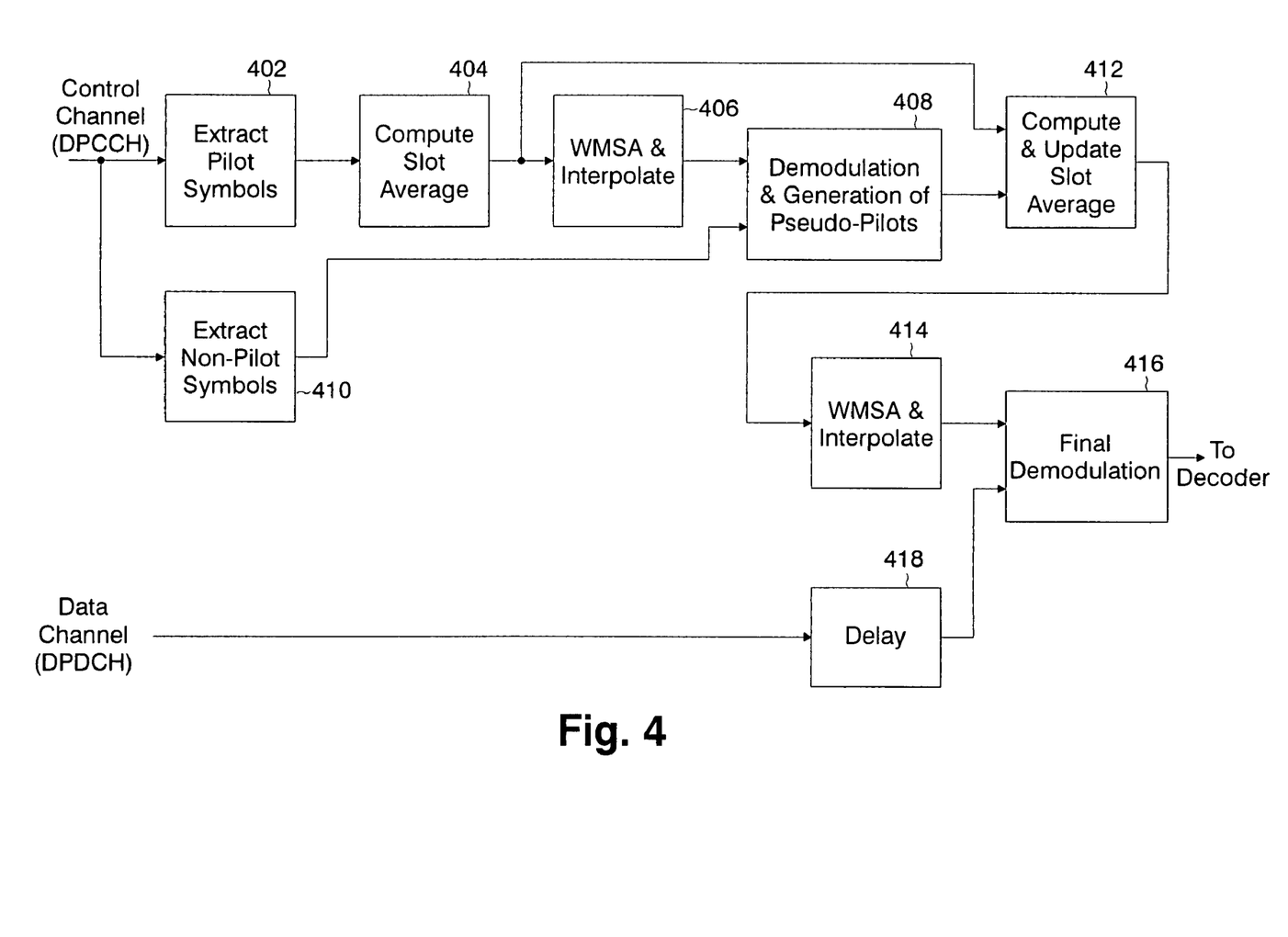
FIG. 4 illustrates a flowchart of the data-aided channel estimation receiver according to a preferred embodiment of the present invention in which pseudo pilot symbols are generated using only a control channel.

With reference to FIGS. 3 and 4, pilot symbols for the $l^{th}$ finger are extracted from the received descrambled and despread code channel (DPCCH) signal (step 402), and input to channel estimator 301, which includes functional section 305 and delay 306. Functional section 305 includes a slot averager, a weighted multi-slot averaging (WMSA) non-causal channel estimation filter, and an interpolator. The slot averager computes a new slot average of the extracted pilot symbols of the nth slot (step 404), and the WMSA filter filters this new slot average, together with previously computed slot averages delayed by the delay 306 to produce a pilot-only based channel estimate $\hat{c}_{i,l}$ (step 406). The estimates from the WMSA filter are further linearly interpolated at the code channel (DPCCH) symbol rate (step 406).

The pilot-only based channel estimate $\hat{c}_{i,l}$ is then input to complex conjugator 302, which calculates a complex conjugate of the pilot-only based channel estimate $\hat{c}^*_{i,l}$. Simultaneously, delay 304 delays the code channel data, which is despread, descrambled data of the lth finger delayed by $D_1$ slots (to account for non-causal WMSA filter delay). This delayed data, along with the complex conjugate of the pilot-only based channel estimate $\hat{c}^*_{i,l}$, is input to channel corrector 303, which multiplies the delayed data by the complex conjugate of the pilot-only based channel estimate $\hat{c}^*_{i,l}$, to thereby channel correct the delayed data. The code channel data symbols from all fingers are channel corrected and maximal ratio combined in combiner 307 (which is similar to combiner 802) to create soft-symbols.

The data-aided channel estimation using control channel only uses the pilot-only based channel estimate $\hat{c}^*_{i,l}$ to make soft-decisions, which are fed back to the fingers 801-1 to 801-L of the RAKE receiver 100 via line 104 to then serve as additional pseudo-pilot symbols that are used, along with the original pilot symbol slot averages, to compute an improved channel estimate.

This data-aided channel estimation using control channel only is represented in FIG. 3 by reference numeral 308. First the soft-symbols are mapped by calculating the hyperbolic tangent in tan h (•) 309 to calculate tentative minimum mean squared error (MMSE) soft-decisions. Demodulator 310 then uses these soft-decisions to remove the modulation from the control channel data symbols (delayed by $D_1$ slots) received from delay 304 to produce pseudo-pilot symbols, which are used to compute an improved channel estimate (step 408). Step 408 in FIG. 4 includes the functions of elements 302, 303, 307, 309, and 310 of FIG. 3, and is further guided by the non-pilot signals extracted at step 410.

The pseudo symbols are input to channel estimator 311, which includes functional section 312 and delay 313. Functional section 312 includes a slot averager, a weighted mean square error (WMSA) non-causal channel estimation filter, and an interpolator. The slot averager receives the pseudo-pilot symbols from demodulator 310, and combines them with pilot-only slot averages that are delayed by $D_1$ slots and received from delay 306, and computes a new slot average (step 412). The WMSA filter then filters this new slot average, together with previously computed pilot-plus-control-channel-data slot averages delayed by delay 313, to yield an improved channel estimate $\hat{c}_{i,l}^{(C)}$, which is based on pilot and control channel data symbols, and is termed a control channel data-aided channel estimate (step 414). For fast fading channels, the estimates from the WMSA filter are further linearly interpolated at the code channel (DPCCH) symbol rate (step 414).

This control channel data-aided channel estimate $\hat{c}_{i,l}^{(C)}$ is then input to complex conjugator 314, which calculates a complex conjugate of the control channel data-aided channel estimate $\hat{c}^*_{i,l}^{(C)}$. Simultaneously, delay 320 delays the data channel data, which is despread, descrambled data of the lth finger delayed by $D_1+D_2$ slots (to account for non-causal WMSA filter delay) (step 418). The purpose of the delay is to coordinate data under observation with the processed control channel signal. This delayed data, along with $\hat{c}^*_{i,l}^{(C)}$, is input to channel corrector 315 (via line 'C'), which multiplies the delayed data by $\hat{c}^*_{i,l}^{(C)}$, to thereby channel correct the delayed data. The data channel data symbols from all fingers are channel corrected and maximal ratio combined in combiner 316 to create data channel soft-symbols.

At this point, these data channel soft-symbols can be used as inputs to the forward error correction (FEC) decoder (803-2 in post-receiver processing block 803 in FIG. 1) (in which case the final demodulation step 416 in FIG. 4 would include the functions of elements 314, 315, and 316 of FIG. 3) or fed back to the fingers 801-1 to 801-L of the RAKE receiver 100 via line 104 and used to perform a third stage of channel estimation, which is described in the next section, to further improve the quality of the channel estimate.

2. Channel Estimation Using Control and Data Channels Serially

After the data-aided channel estimation is performed as described above, a third stage of channel estimation (using the data channel), may be performed to further improve the channel estimate of the second stage (which used the control channel). By way of overview, this third stage uses the control channel data-aided channel estimate of the second stage to make soft-decisions, which then serve as additional pseudo-pilot symbols that are used, along with the pilot and control channel data slot averages, to compute a further improved channel estimate. This third stage of channel estimation is described with reference to FIGS. 3 and 5. Since some of the steps of the channel estimation using only the control channel are the same as described above with reference to FIG. 4, the same reference numerals are used and their description omitted here for the sake of brevity.

The third stage of channel estimation, which uses the data channel, is represented in FIG. 3 by reference numeral 317, with switch 328 positioned in the 'A' position. First the data channel soft-symbols are mapped by calculating the hyperbolic tangent in tan h (•) 318 to calculate tentative minimum mean squared error (MMSE) soft-decisions. Demodulator 319 then uses these soft-decisions to remove the modulation from the data channel data symbols (delayed by $D_1+D_2$ slots) received from delay 320 to produce pseudo-pilot symbols, which are used to compute a further improved channel estimate (steps 502 and 504). (Delay 502 is to coordinate data under observation with the processed control channel signal, and demodulation step 504 in FIG. 5 includes the functions of elements 314, 315, 316, 318, and 319 of FIG. 3) The pseudo-pilot symbols may be soft decisions that are generated by weighting the demodulator output 307, 316 or 327 by the signal-to-noise noise plus interference ratio before the non-linear function is applied. The pseudo-pilot symbols may also be generated using hard decisions.

These pseudo-pilot symbols are input to channel estimator 321, which includes functional section 322 and delay 323. Like functional sections 305 and 312, functional section 322 includes a slot averager, a weighted multi-slot averaging (WMSA) non-causal estimation filter, and an interpolator. The slot averager receives the pseudo-pilot symbols from demodulator 319, and combines them with pilot-plus-control-channel-data slot averages that are delayed by $D_1+D_2$ slots and received from delay 313, and computes a new slot average (step 508). The WMSA filter filters this new slot average, together with previously computed pilot-plus-control-channel-data-plus-data-channel-data slot averages delayed by delay 323, to yield a further improved channel estimate $\hat{c}_{i,l}^{(D)}$, which is based on pilot and control channel data symbols and data channel data symbols, and is also termed data channel data-aided channel estimate (step 510). The estimates from the WMSA filter are further linearly interpolated at the code channel (DPCCH) symbol rate (step 510).

This data channel data-aided channel estimate $\hat{c}_{i,l}^{(D)}$, is then input to complex conjugator 324, which calculates a complex conjugate of the data channel data-aided channel estimate $\hat{c}^*_{i,l}^{(D)}$. Simultaneously, delay 325 (which corresponds to the delay step 506) delays the data channel data, which is despread descrambled data of the lth finger delayed by $D_1+D_2+D_3$ slots (to account for non-causal WMSA filter delay). This delayed data, along with the complex conjugate of the data channel data-aided channel estimate $\hat{c}^*_{i,l}^{(D)}$, is input to channel corrector 326 (via line 'A'), which multiples the delayed data by the complex conjugate of the data channel data-aided channel estimate $\hat{c}^*_{i,l}^{(D)}$, to thereby channel correct the delayed data. The data channel data symbols from all fingers are channel corrected and maximal ratio combined in combiner 327 (which is similar to the combiner 802) to yield the final soft-decisions that are input to the FEC decoder 803-2. The final demodulation step 512 in FIG. 5 includes the functions of elements 324, 326, and 327 of FIG. 3.

3. Channel Estimation Using Control and Data Channels Concurrently

Alternatively, the second stage (i.e., channel estimation using the control channel) and third stage (i.e., channel estimation using the data channel) of channel estimation can be performed concurrently rather than serially. That is, steps 504, 506, and 508 are performed concurrently with steps 408, 412, and 414, respectively. In the alternative embodiment, the concurrent use of the control and data channel again uses the pilot-only based channel estimate $\hat{c}^*_{i,l}$ to make soft-decisions, and this estimate provides additional pseudo-pilot symbols that are used, along with the pilot-plus-control-channel-data slot averages, to compute an improved channel estimate. This second, combined stage of channel estimation is described with reference to FIGS. 3 and 6. Since some of the steps of the channel estimation using only the control channel are the same as described above with reference to FIGS. 3 and 4, the same reference numerals are used and their description omitted here for the sake of brevity.

The second, combined stage of channel estimation, which uses the data and control channels, is represented in FIG. 3 by reference numerals 308 and 317, with switch 328 position in the "B" position.

First the soft-symbols are mapped by calculating the hyperbolic tangents in each of tan h (•) 309, 318 to calculate tentative minimum mean squared error (MMSE) soft-decisions. Demodulators 310 and 319 then simultaneously use these soft-decisions to remove the modulation from the control channel data symbols (delayed by $D_1$ slots and $D_1+D_2$ slots, respectively) received from delay 304 and 320, respectively, to produce pseudo-pilot symbols, which are used to compute an improved channel estimate (step 602).

The pseudo symbols are input to channel estimators 311 and 321, respectively. The slot averages of each of the channel estimators 311 and 321 receives the pseudo-pilot symbols from demodulator 310 and 319, respectively, and combines them with pilot-only slot averages that are delayed by $D_1$ slots and received from delay 306, and computes new slot averages (step 604). The WMSA filters then filter these new slot average, together with previously computed pilot slot averages delayed by delay 313, to yield improved channel estimates $\hat{c}_{i,l}^{(C)}$, which are based on pilot and control channel data symbols, and $\hat{c}_{i,l}^{(D)}$, which are based on pilot and data channel data symbols (step 606). For fast fading channels, the estimates from the WMSA filters are further linearly interpolated at the code channel (DPCCH) symbol rate (step 606).

This control-channel data-aided channel estimate $\hat{c}_{i,l}^{(C)}$ and the data-channel data-aided channel estimate $\hat{c}_{i,l}^{(D)}$ are then input to complex conjugators 314 and 324, respectively, which calculate complex conjugates of the control-channel data-aided channel estimate $\hat{c}^*_{i,l}^{(C)}$ and the data-channel data-aided channel estimate $\hat{c}_{i,l}^{(D)}$, respectively. Simultaneously, delay 320 (which corresponds to delay step 418) delays the data channel data, which is despread, descrambled data of the lth finger delayed by $D_1+D_2$ slots (to account for non-causal WMSA filter delay). This delayed data, along with $\hat{c}^*_{i,l}^{(C)}$ and $\hat{c}_{i,l}^{(D)}$, respectively, are input to channel corrector 315 (via line 'C') and channel corrector 326 (via line 'B'), which multiplies the delayed data by $\hat{c}^*_{i,l}^{(C)}$ and $\hat{c}_{i,l}^{(D)}$, respectively, to thereby channel correct the delayed data. The data channel data symbols from all fingers are channel corrected and maximal ratio combined in combiner 316, and the control channel data symbols from all fingers are channel corrected and maximal ratio combined in combiner 327, to create data channel soft-symbols that are used as inputs to the forward error correction (FEC) decoder in the post-receiver processing block 803 to improve the quality of the channel estimate. The final demodulation step 608 in FIG. 6 includes the functions of elements 324, 326, and 327 of FIG. 3.

Note that in the embodiments described above, the tentative MMSE soft-decisions can be replaced by hard-decisions for simplicity, but at a small loss in link performance.

While the invention has been described in detail with particular reference to certain embodiments thereof, the invention is capable of other and different embodiments, and its details are capable of modifications in various obvious respects. As would be readily apparent to those skilled in the art, variations and modifications can be affected while remaining within the spirit and scope of the invention. Accordingly, the foregoing disclosure, description, and drawing figures are for illustrative purposes only, and do not in any way limit the invention, which is defined only by the claims.

What is claimed is:

1. A method for forming a channel estimate for a communications channel in a communication system, the communication system having a receiver that receives over the communications channel signals including pilot symbols, control symbols, and a set of data symbols, the method comprising:
   a) calculating a pilot-only based channel estimate using the pilot symbols in a first pass through a portion of a control channel;
   b) generating pseudo pilot symbols on a basis of a control channel using the pilot-only based channel estimate;
   c) using the pseudo pilot symbols to refine the pilot-only based channel estimate;
   d) weighting the set of data symbols using the refined channel estimate; and
   e) outputting the weighted set of symbols to a decoder stage.

2. The method of claim 1, wherein the generating step includes generating the pseudo pilot symbols on the basis of the control channel only.

3. The method of claim 1, wherein the generating step includes generating the pseudo pilot symbols on the basis of the control channel and the data channel serially.

4. The method of claim 1, wherein the generating step includes generating the pseudo pilot symbols on the basis of the control channel and the data channel concurrently.

5. The method of claim 1, wherein the decoder stage is after the receiver, and all steps are performed in the receiver.

6. The method of claim 1, wherein the pseudo pilot symbols are soft decisions based on a minimum mean squared estimate of the received data symbols.

7. The method of claim 1, wherein the pseudo pilot symbols are hard decisions.

8. A method for forming a channel estimate for a communications channel in a communication system, the communication system having a receiver that receives over the communications channel signals including pilot symbols, control symbols, and a set of data symbols, the method comprising:
   a) providing a pilot-only based channel estimate for use in the communication system;
   b) generating pseudo pilot symbols on a basis of a control channel using the pilot-only based channel estimate;
   c) using the pseudo pilot symbols to refine the pilot-only based channel estimate;
   d) weighting the set of data symbols using the refined channel estimate; and
   e) outputting the weighted set of symbols to a decoder stage.

9. A system for forming a channel estimate for a communications channel in a communication system having a receiver that receives over the communications channel signals including pilot symbols, control symbols, and a set of data symbols, the communication channel including a data channel portion and a control channel portion, the system comprising:
   a) means for calculating a pilot-only based channel estimate using the pilot symbols in a first pass through the control channel portion;
   b) means for generating pseudo pilot symbols on a basis of information in the control channel portion using the pilot-only based channel estimate;
   c) means for using the pseudo pilot symbols to refine the pilot-only based channel estimate;
   d) means for weighting the set of data symbols using the refined channel estimate; and
   e) means for outputting the weighted set of symbols to a decoder stage.

10. The system of claim 9, wherein the means for generating the pseudo pilot symbols generates the pseudo pilot symbols on the basis of the control channel only.

11. The system of claim 9, wherein the means for generating the pseudo pilot symbols generates the pseudo pilot symbols on the basis of the control channel and the data channel serially.

12. The system of claim 9, wherein the means for generating the pseudo pilot symbols generates the pseudo pilot symbols on the basis of the control channel and the data channel concurrently.

13. The system of claim 9, wherein the decoder stage is after the receiver, and all means are in the receiver.

14. The system of claim 9, wherein the pseudo pilot symbols are soft decisions based on a minimum mean squared estimate of the received data symbols.

15. The system of claim 9, wherein the pseudo pilot symbols are hard decisions.

16. A system for forming a channel estimate for a communications channel in a communication system having a receiver that receives over the communications channel signals including pilot symbols, control symbols, and a set of data symbols, the communications channel including a control channel portion and a data channel portion, the system comprising:
   a) means for providing a pilot-only based channel estimate;
   b) means for generating pseudo pilot symbols using information in the control channel portion and the pilot-only based channel estimate;
   c) means for using the pseudo pilot symbols to refine the pilot-only based channel estimate;
   d) means for weighting a set of data symbols using the refined channel estimate; and
   e) means for outputting the weighted set of symbols to a decoder stage.

17. A system for forming a channel estimate for a communications channel in a communication system having a receiver that receives over the communications channel signals including pilot symbols, control symbols, and a set of data symbols, the communications channel including a control channel portion and a data channel portion, the system comprising:

a processor;

a memory communicatively coupled to the processor; and software executing in the processor configured to:
- a) calculate a pilot-only based channel estimate using the pilot symbols in a first pass through the control channel portion;
- b) store the pilot-only based channel estimate in the memory;
- c) generate pseudo pilot symbols on a basis of information in the control channel portion;
- d) store the pseudo pilot symbols in the memory;
- e) use the pseudo pilot symbols to refine the pilot-only based channel estimate;
- f) store the refined pilot-only based channel estimate in the memory;
- g) weight a set of data symbols using the refined channel estimate;
- h) store the weighted set of data symbols in the memory; and
- i) output the weighted set of symbols to a decoder stage.

18. A system for forming a channel estimate for a communications channel in a communication system having a receiver that receives over the communications channel signals including pilot symbols, control symbols, and a set of data symbols, the communications channel including a control channel portion and a data channel portion, the system comprising:

a processor;

a memory communicatively coupled to the processor; and software executing in the processor configured to:
- a) provide a pilot-only based channel estimate;
- b) store the pilot-only based channel estimate in the memory;
- c) generate pseudo pilot symbols on a basis of a control channel;
- d) store the pseudo pilot symbols in the memory;
- e) use the pseudo pilot symbols to refine the pilot-only based channel estimate;
- f) store the refined pilot-only based channel estimate in the memory;
- g) weight a set of data symbols using the refined channel estimate;
- h) store the weighted set of data symbols in the memory; and
- i) output the weighted set of symbols to a decoder stage.

19. A method for forming a channel estimate for a communications channel in a communication system, the communications channel including a data channel and a control channel, the control channel comprising pilot symbols and control symbols, the data channel carrying encoded data, the control channel and the data channel having a frame structure, the communication system having a receiver that receives over the communications channel signals including pilot symbols, control symbols, and a set of data symbols, the method comprising:

- a) providing a pilot-only based channel estimate for use in the communication system, wherein providing the pilot-only based channel estimate comprises computing a pilot-only slot average of the pilot symbols of the slot, wherein a slot is a portion of a frame having a time duration;
- b) generating pseudo pilot symbols on a basis of data in the control channel and the pilot-only based channel estimate, wherein generating the pseudo pilot symbols includes multiplying control channel data with the complex conjugate of the pilot-only based channel estimate to obtain channel-corrected data, and removing a modulation from the control channel data;
- c) using the pseudo pilot symbols to refine the pilot-only based channel estimate by combining the pseudo-pilot symbols with the pilot-only slot average, computing a new slot average, and by using the new slot average for obtaining an improved channel estimate;
- d) weighting the set of data symbols using the refined channel estimate; and
- e) outputting the weighted set of symbols to a decoder stage.

20. A system for forming a channel estimate for a communications channel in a communication system having a receiver that receives over the communications channel signals including pilot symbols, control symbols, and a set of data symbols, the communication channel including a data channel portion and a control channel portion, the data channel carrying encoded data, the control channel and the data channel having a frame structure, the control channel portion comprising pilot symbols and control symbols, the data channel portion carrying encoded data, the system comprising:

- a) means for calculating a pilot-only based channel estimate using the pilot symbols in a first pass through the control channel portion, wherein calculating the pilot-only based channel estimate comprises computing a pilot-only slot average of the pilot symbols of the slot, wherein a slot is a portion of a frame having a time duration;
- b) means for generating pseudo pilot symbols on a basis of data in the control channel portion and the pilot-only based channel estimate, wherein generating the pseudo-pilot symbols includes multiplying control channel data with the complex conjugate f the pilot-only based channel estimate to obtain channel-corrected data, and removing a modulation from the control channel data;
- c) means for using the pseudo pilot symbols to refine the pilot-only based channel estimate by combining the pseudo-pilot symbols with the pilot-only slot average, computing a new slot average, and by using the new slot average for obtaining an improved channel estimate;
- d) means for weighting the set of data symbols using the refined channel estimate; and
- e) means for outputting the weighted set of symbols to a decoder stage.

* * * * *